United States Patent
Hallgren et al.

(10) Patent No.: US 10,956,406 B2
(45) Date of Patent: Mar. 23, 2021

(54) PROPAGATED DELETION OF DATABASE RECORDS AND DERIVED DATA

(71) Applicant: Palantir Technologies Inc., Palo Alto, CA (US)

(72) Inventors: Jeppe Hallgren, Copenhagen (DK); Ammaar Reshi, Palo Alto, CA (US); James Thompson, London (GB)

(73) Assignee: Palantir Technologies Inc., Palo Alto, CA (US)

(*) Notice: Subject to any disclaimer, the term of this patent is extended or adjusted under 35 U.S.C. 154(b) by 221 days.

(21) Appl. No.: 15/990,338

(22) Filed: May 25, 2018

(65) Prior Publication Data

US 2018/0357235 A1 Dec. 13, 2018

Related U.S. Application Data

(60) Provisional application No. 62/518,421, filed on Jun. 12, 2017.

(51) Int. Cl.
- *G06F 16/23* (2019.01)
- *G06F 16/242* (2019.01)
- *G06F 16/25* (2019.01)

(52) U.S. Cl.
CPC ...... *G06F 16/2386* (2019.01); *G06F 16/2365* (2019.01); *G06F 16/2433* (2019.01); *G06F 16/254* (2019.01)

(58) Field of Classification Search
None
See application file for complete search history.

(56) References Cited

U.S. PATENT DOCUMENTS

| | | |
|---|---|---|
| 5,109,399 A | 4/1992 | Thompson |
| 5,329,108 A | 7/1994 | Lamoure |

(Continued)

FOREIGN PATENT DOCUMENTS

| | | |
|---|---|---|
| AU | 2014206155 | 12/2015 |
| AU | 2014250678 | 2/2016 |

(Continued)

OTHER PUBLICATIONS

Canese et al., "Chapter 2: PubMed: The Bibliographic Database," The NCBI Handbook, Oct. 2002, pp. 1-10.

(Continued)

*Primary Examiner* — Son T Hoang
(74) *Attorney, Agent, or Firm* — Hickman Becker Bingham Ledesma LLP

(57) ABSTRACT

Using a distributed database system that manages a plurality of different raw datasets and a plurality of derived datasets that have been derived from the raw datasets based on a plurality of derivation relationships that link the raw datasets to the derived datasets, a subset of records that are candidates for propagated deletion of specified data values is determined. One or more particular raw datasets that contain the subset of records is determined. The specified data values from the particular raw datasets is deleted. Based on the plurality of derivation relationships and the particular raw datasets, one or more particular derived datasets that have been derived from the particular raw datasets is identified. A build of one or more particular derived datasets to result in creating and storing one or more particular derived datasets without the specified data values deleted from the particular raw datasets is generated and executed.

20 Claims, 5 Drawing Sheets

(56) References Cited

U.S. PATENT DOCUMENTS

| | | | |
|---|---|---|---|
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,818,737 A | 10/1998 | Orr et al. |
| 5,845,300 A | 12/1998 | Comer |
| 6,057,757 A | 5/2000 | Arrowsmith et al. |
| 6,091,956 A | 7/2000 | Hollenberg |
| 6,094,653 A | 7/2000 | Li et al. |
| 6,134,543 A * | 10/2000 | Witkowski | G06F 16/24553 |
| 6,161,098 A | 12/2000 | Wallman |
| 6,167,405 A | 12/2000 | Rosensteel, Jr. et al. |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,289,338 B1 | 9/2001 | Stoffel et al. |
| 6,341,310 B1 | 1/2002 | Leshem et al. |
| 6,366,933 B1 | 4/2002 | Ball et al. |
| 6,369,835 B1 | 4/2002 | Lin |
| 6,430,305 B1 | 8/2002 | Decker |
| 6,456,997 B1 | 9/2002 | Shukla |
| 6,463,404 B1 | 10/2002 | Appleby |
| 6,523,172 B1 | 2/2003 | Martinez-Guerra et al. |
| 6,539,538 B1 | 3/2003 | Brewster et al. |
| 6,549,752 B2 | 4/2003 | Tsukamoto |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,640,231 B1 | 10/2003 | Andersen et al. |
| 6,642,945 B1 | 11/2003 | Sharpe |
| 6,643,613 B2 | 11/2003 | McGee et al. |
| 6,714,936 B1 | 3/2004 | Nevin, III |
| 6,748,481 B1 | 6/2004 | Parry et al. |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,013,313 B1 * | 3/2006 | LaRue | G06F 16/27 |
| 7,027,974 B1 | 4/2006 | Busch et al. |
| 7,028,223 B1 | 4/2006 | Kolawa et al. |
| 7,036,085 B2 | 4/2006 | Barros |
| 7,043,702 B2 | 5/2006 | Chi et al. |
| 7,055,110 B2 | 5/2006 | Kupka et al. |
| 7,089,541 B2 | 8/2006 | Ungar |
| 7,117,430 B2 | 10/2006 | Maguire et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,194,680 B1 | 3/2007 | Roy et al. |
| 7,237,192 B1 | 6/2007 | Stephenson et al. |
| 7,240,330 B2 | 7/2007 | Fairweather |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,533,069 B2 | 5/2009 | Fairweather |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,685,083 B2 | 3/2010 | Fairweather |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,739,246 B2 | 6/2010 | Mooney et al. |
| 7,756,843 B1 | 7/2010 | Palmer |
| 7,761,407 B1 | 7/2010 | Stern |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,814,084 B2 | 10/2010 | Hallett et al. |
| 7,818,658 B2 | 10/2010 | Chen |
| 7,870,493 B2 | 1/2011 | Pall et al. |
| 7,877,421 B2 | 1/2011 | Berger et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,103,543 B1 | 1/2012 | Zwicky |
| 8,117,022 B2 | 2/2012 | Linker |
| 8,132,149 B2 | 3/2012 | Shenfield et al. |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,271,948 B2 | 9/2012 | Talozi et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |

(56) References Cited

U.S. PATENT DOCUMENTS

| | | |
|---|---|---|
| 8,332,354 B1 | 12/2012 | Chatterjee et al. |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,418,085 B2 | 4/2013 | Snook et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,494 B1 | 10/2013 | Downing |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,601,326 B1 | 12/2013 | Kirn |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,688,573 B1 | 4/2014 | Ruknoic et al. |
| 8,689,108 B1 | 4/2014 | Duffield et al. |
| 8,689,182 B2 | 4/2014 | Leithead et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,799,867 B1 | 8/2014 | Peri-Glass et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,838,556 B1 | 9/2014 | Reiner et al. |
| 8,855,999 B1 | 10/2014 | Elliot |
| 8,868,537 B1 | 10/2014 | Colgrove et al. |
| 8,903,717 B2 | 12/2014 | Elliot |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,897 B2 | 1/2015 | Nassar |
| 8,937,619 B2 | 1/2015 | Sharma et al. |
| 8,938,434 B2 | 1/2015 | Jain et al. |
| 8,938,686 B1 | 1/2015 | Erenrich et al. |
| 8,949,164 B1 | 2/2015 | Mohler |
| 8,954,410 B2 | 2/2015 | Chang et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,092,482 B2 | 7/2015 | Harris et al. |
| 9,100,428 B1 | 8/2015 | Visbal |
| 9,116,975 B2 | 8/2015 | Shankar et al. |
| 9,129,219 B1 | 9/2015 | Robertson et al. |
| 9,146,954 B1 | 9/2015 | Boe et al. |
| 9,201,920 B2 | 12/2015 | Jain et al. |
| 9,208,159 B2 | 12/2015 | Stowe et al. |
| 9,223,773 B2 | 12/2015 | Isaacson |
| 9,229,952 B1 | 1/2016 | Meacham et al. |
| 9,230,060 B2 | 1/2016 | Friedlander et al. |
| 9,230,280 B1 | 1/2016 | Maag et al. |
| 9,280,532 B2 | 3/2016 | Cicerone |
| 9,576,015 B1 | 2/2017 | Tolnay et al. |
| 9,921,918 B1* | 3/2018 | Yellapragada ......  G06F 11/1448 |
| 9,946,738 B2 | 4/2018 | Meacham et al. |
| 2001/0056522 A1 | 12/2001 | Satyanarayana |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194058 A1 | 12/2002 | Eldering |
| 2002/0194119 A1 | 12/2002 | Wright et al. |
| 2003/0028560 A1 | 2/2003 | Kudrolli et al. |
| 2003/0036848 A1 | 2/2003 | Sheha et al. |
| 2003/0039948 A1 | 2/2003 | Donahue |
| 2003/0074187 A1 | 4/2003 | Ait-Mokhtar et al. |
| 2003/0088438 A1 | 5/2003 | Maughan et al. |
| 2003/0126102 A1 | 7/2003 | Borthwick |
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0171942 A1 | 9/2003 | Gaito |
| 2003/0172053 A1 | 9/2003 | Fairweather |
| 2003/0177112 A1 | 9/2003 | Gardner |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044992 A1 | 3/2004 | Muller et al. |
| 2004/0064256 A1 | 4/2004 | Barinek et al. |
| 2004/0083466 A1 | 4/2004 | Dapp et al. |
| 2004/0085318 A1 | 5/2004 | Hassler et al. |
| 2004/0095349 A1 | 5/2004 | Bito et al. |
| 2004/0103124 A1 | 5/2004 | Kupkova |
| 2004/0111410 A1 | 6/2004 | Burgoon et al. |
| 2004/0111480 A1 | 6/2004 | Yue |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0153837 A1 | 8/2004 | Preston et al. |
| 2004/0163039 A1 | 8/2004 | Gorman |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0091420 A1 | 4/2005 | Snover et al. |
| 2005/0102328 A1 | 5/2005 | Ring et al. |
| 2005/0125715 A1 | 6/2005 | Di Franco et al. |
| 2005/0143602 A1 | 6/2005 | Yada et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0203933 A1* | 9/2005 | Chaudhuri ............  G06F 16/86 |
| 2005/0210409 A1 | 9/2005 | Jou |
| 2005/0246327 A1 | 11/2005 | Yeung et al. |
| 2005/0251786 A1 | 11/2005 | Citron et al. |

(56) References Cited

U.S. PATENT DOCUMENTS

| | | |
|---|---|---|
| 2006/0026120 A1 | 2/2006 | Carolan et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0095521 A1 | 5/2006 | Patinkin |
| 2006/0106847 A1 | 5/2006 | Eckardt et al. |
| 2006/0129746 A1 | 6/2006 | Porter |
| 2006/0129992 A1 | 6/2006 | Oberholtzer et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0161558 A1 | 7/2006 | Tamma et al. |
| 2006/0184889 A1 | 8/2006 | Molander |
| 2006/0203337 A1 | 9/2006 | White |
| 2006/0209085 A1 | 9/2006 | Wong et al. |
| 2006/0218405 A1 | 9/2006 | Ama et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0271838 A1 | 11/2006 | Carro |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0074169 A1 | 3/2007 | Chess et al. |
| 2007/0078832 A1 | 4/2007 | Ott et al. |
| 2007/0078872 A1 | 4/2007 | Cohen |
| 2007/0083541 A1 | 4/2007 | Fraleigh et al. |
| 2007/0094389 A1 | 4/2007 | Nussey et al. |
| 2007/0112714 A1 | 5/2007 | Fairweather |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0174760 A1 | 7/2007 | Chamberlain et al. |
| 2007/0185850 A1 | 8/2007 | Walters et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0034327 A1 | 2/2008 | Cisler et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0103996 A1 | 5/2008 | Forman et al. |
| 2008/0104019 A1 | 5/2008 | Nath |
| 2008/0104060 A1 | 5/2008 | Abhyankar et al. |
| 2008/0104407 A1 | 5/2008 | Horne et al. |
| 2008/0126951 A1 | 5/2008 | Sood et al. |
| 2008/0140387 A1 | 6/2008 | Linker |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1 | 11/2008 | MacIntyre et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0037417 A1 | 2/2009 | Shankar et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150854 A1 | 6/2009 | Elaasar et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0199047 A1 | 8/2009 | Vaitheeswaran et al. |
| 2009/0222400 A1 | 9/2009 | Kupershmidt et al. |
| 2009/0222760 A1 | 9/2009 | Halverson et al. |
| 2009/0228507 A1 | 9/2009 | Jain et al. |
| 2009/0234720 A1 | 9/2009 | George et al. |
| 2009/0240664 A1 | 9/2009 | Dinker et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0281839 A1 | 11/2009 | Lynn et al. |
| 2009/0282097 A1 | 11/2009 | Alberti et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0310816 A1 | 12/2009 | Freire et al. |
| 2009/0313463 A1 | 12/2009 | Pang et al. |
| 2009/0319418 A1 | 12/2009 | Herz |
| 2009/0319891 A1 | 12/2009 | MacKinlay |
| 2009/0327208 A1 | 12/2009 | Bittner et al. |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070489 A1 | 3/2010 | Aymeloglu et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0082532 A1 | 4/2010 | Shaik et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |

(56) References Cited

U.S. PATENT DOCUMENTS

| | | |
|---|---|---|
| 2010/0114629 A1 | 5/2010 | Adler et al. |
| 2010/0114887 A1 | 5/2010 | Conway et al. |
| 2010/0122152 A1 | 5/2010 | Chamberlain et al. |
| 2010/0125470 A1 | 5/2010 | Chisholm |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0204983 A1 | 8/2010 | Chung et al. |
| 2010/0211550 A1 | 8/2010 | Daniello et al. |
| 2010/0228786 A1 | 9/2010 | Torok |
| 2010/0228812 A1 | 9/2010 | Uomini |
| 2010/0235915 A1 | 9/2010 | Memon et al. |
| 2010/0250412 A1 | 9/2010 | Wagner |
| 2010/0257015 A1 | 10/2010 | Molander |
| 2010/0257515 A1 | 10/2010 | Bates et al. |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306285 A1 | 12/2010 | Shah et al. |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318838 A1 | 12/2010 | Katano et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0106770 A1* | 5/2011 | McDonald .......... G06F 16/1873 707/661 |
| 2011/0117878 A1 | 5/2011 | Barash et al. |
| 2011/0119100 A1 | 5/2011 | Ruhl et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0153592 A1 | 6/2011 | DeMarcken |
| 2011/0161096 A1 | 6/2011 | Buehler et al. |
| 2011/0161132 A1 | 6/2011 | Goel et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0181598 A1 | 7/2011 | O'Neall et al. |
| 2011/0185316 A1 | 7/2011 | Reid et al. |
| 2011/0191672 A1* | 8/2011 | Schodl .................. G06F 17/00 715/273 |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0213791 A1 | 9/2011 | Jain et al. |
| 2011/0218934 A1 | 9/2011 | Elser |
| 2011/0218955 A1 | 9/2011 | Tang |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0238553 A1 | 9/2011 | Raj et al. |
| 2011/0258158 A1 | 10/2011 | Resende et al. |
| 2011/0258216 A1 | 10/2011 | Supakkul et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0295795 A1 | 12/2011 | Venkatasubramanian et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290527 A1 | 11/2012 | Yalamanchilli |
| 2012/0290879 A1 | 11/2012 | Shibuya et al. |
| 2012/0296907 A1 | 11/2012 | Long et al. |
| 2012/0304150 A1 | 11/2012 | Leithead et al. |
| 2012/0311684 A1 | 12/2012 | Paulsen et al. |
| 2012/0323888 A1 | 12/2012 | Osann, Jr. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0006947 A1 | 1/2013 | Akinyemi et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024731 A1 | 1/2013 | Shochat et al. |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0054306 A1 | 2/2013 | Bhalla |
| 2013/0057551 A1 | 3/2013 | Ebert et al. |
| 2013/0060742 A1 | 3/2013 | Chang et al. |
| 2013/0060786 A1 | 3/2013 | Serrano et al. |
| 2013/0061169 A1 | 3/2013 | Pearcy et al. |
| 2013/0073377 A1 | 3/2013 | Heath |

(56) References Cited

U.S. PATENT DOCUMENTS

| | | |
|---|---|---|
| 2013/0073454 A1 | 3/2013 | Busch |
| 2013/0078943 A1 | 3/2013 | Biage et al. |
| 2013/0086482 A1 | 4/2013 | Parsons |
| 2013/0091084 A1 | 4/2013 | Lee |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0124193 A1 | 5/2013 | Holmberg |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0198565 A1 | 8/2013 | Mancoridis et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226879 A1 | 8/2013 | Talukder et al. |
| 2013/0226953 A1 | 8/2013 | Markovich et al. |
| 2013/0238616 A1 | 9/2013 | Rose et al. |
| 2013/0246170 A1 | 9/2013 | Gross et al. |
| 2013/0246316 A1 | 9/2013 | Zhao et al. |
| 2013/0246537 A1 | 9/2013 | Gaddala |
| 2013/0246560 A1 | 9/2013 | Feng et al. |
| 2013/0246597 A1 | 9/2013 | Iizawa et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0275446 A1 | 10/2013 | Jain et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2014/0012796 A1 | 1/2014 | Petersen et al. |
| 2014/0019423 A1 | 1/2014 | Leinsberger et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108346 A1 | 4/2014 | Pinkney et al. |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1 | 6/2014 | Grigg et al. |
| 2014/0156617 A1 | 6/2014 | Tomkins |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0279979 A1 | 9/2014 | Yost et al. |
| 2014/0310266 A1 | 10/2014 | Greenfield |
| 2014/0316911 A1 | 10/2014 | Gross |
| 2014/0324876 A1 | 10/2014 | Konik et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0019394 A1 | 1/2015 | Unser et al. |
| 2015/0039886 A1 | 2/2015 | Kahol et al. |
| 2015/0046481 A1 | 2/2015 | Elliot |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0095773 A1 | 4/2015 | Gonsalves et al. |
| 2015/0100559 A1 | 4/2015 | Nassar |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0112641 A1 | 4/2015 | Faraj |
| 2015/0112998 A1 | 4/2015 | Shankar et al. |
| 2015/0134666 A1 | 5/2015 | Gattiker et al. |
| 2015/0135256 A1 | 5/2015 | Hoy et al. |
| 2015/0142766 A1 | 5/2015 | Jain et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188715 A1 | 7/2015 | Castelluci et al. |
| 2015/0188872 A1 | 7/2015 | White |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0242397 A1 | 8/2015 | Zhuang |
| 2015/0261817 A1 | 9/2015 | Harris et al. |
| 2015/0261847 A1 | 9/2015 | Ducott et al. |
| 2015/0324868 A1 | 11/2015 | Kaftan et al. |
| 2015/0338233 A1 | 11/2015 | Cervelli et al. |
| 2015/0341467 A1 | 11/2015 | Lim et al. |
| 2015/0347903 A1 | 12/2015 | Saxena et al. |
| 2015/0378996 A1 | 12/2015 | Kesin et al. |
| 2015/0379413 A1 | 12/2015 | Robertson et al. |
| 2016/0004667 A1 | 1/2016 | Chakerian et al. |
| 2016/0004764 A1 | 1/2016 | Chakerian et al. |
| 2016/0034545 A1 | 2/2016 | Shankar et al. |
| 2016/0062555 A1 | 3/2016 | Ward et al. |
| 2016/0098173 A1 | 4/2016 | Slawinski et al. |
| 2016/0125000 A1 | 5/2016 | Meacham et al. |
| 2016/0147730 A1 | 5/2016 | Cicerone |
| 2017/0039253 A1 | 2/2017 | Bond |
| 2017/0068698 A1 | 3/2017 | Tolnay et al. |

(56) References Cited

U.S. PATENT DOCUMENTS

| | | |
|---|---|---|
| 2017/0083595 A1 | 3/2017 | Tolnay et al. |
| 2017/0097950 A1 | 4/2017 | Meacham et al. |

FOREIGN PATENT DOCUMENTS

| | | |
|---|---|---|
| CA | 2666364 | 1/2015 |
| CN | 102546446 | 7/2012 |
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014204840 | 9/2014 |
| DE | 102014213036 | 1/2015 |
| DE | 102014215621 | 2/2015 |
| EP | 0652513 | 5/1995 |
| EP | 1566758 | 8/2005 |
| EP | 1672527 | 6/2006 |
| EP | 1962222 | 8/2008 |
| EP | 2221725 | 8/2010 |
| EP | 2487610 | 8/2012 |
| EP | 2551799 | 1/2013 |
| EP | 2560134 | 2/2013 |
| EP | 2778913 | 9/2014 |
| EP | 2778914 | 9/2014 |
| EP | 2778977 | 9/2014 |
| EP | 2778986 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2897051 | 7/2015 |
| EP | 2911078 | 8/2015 |
| EP | 2963595 | 1/2016 |
| EP | 2993595 | 3/2016 |
| EP | 3018553 | 5/2016 |
| EP | 3128447 | 2/2017 |
| EP | 3142027 | 3/2017 |
| EP | 3258393 | 12/2017 |
| GB | 2366498 | 3/2002 |
| GB | 2513007 | 10/2014 |
| GB | 2516155 | 1/2015 |
| GB | 2517582 | 2/2015 |
| GB | 2518745 | 4/2015 |
| NL | 2012778 | 11/2014 |
| NL | 2013134 | 1/2015 |
| NL | 2013306 | 2/2015 |
| NL | 2011642 | 8/2015 |
| NZ | 624557 | 12/2014 |
| WO | WO 2000/009529 | 2/2000 |
| WO | WO 2002/035376 | 5/2002 |
| WO | WO 2002/065353 | 8/2002 |
| WO | WO 2003/060751 | 7/2003 |
| WO | WO 2005/010685 | 2/2005 |
| WO | WO 2005/104736 | 11/2005 |
| WO | WO 2005/116851 | 12/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/0098958 | 9/2010 |
| WO | WO 2011/017289 | 5/2011 |
| WO | WO 2011/071833 | 6/2011 |
| WO | WO 2012/025915 | 3/2012 |
| WO | WO 2012/079836 | 6/2012 |
| WO | WO 2013/010157 | 1/2013 |
| WO | WO 2013/067077 | 5/2013 |
| WO | WO2013/083793 | 6/2013 |
| WO | WO 2013/102892 | 7/2013 |

OTHER PUBLICATIONS

Sirotkin et al., "Chapter 13: The Processing of Biological Sequence Data at NCBI," The NCBI Handbook, Oct. 2002, pp. 1-11.

Mizrachi, Ilene, "Chapter 1: GenBank: The Nuckeotide Sequence Database," The NCBI Handbook, Oct. 2002, pp. 1-14.

"A Tour of Pinboard," <http://pinboard.in/tour> as printed May 15, 2014 in 6 pages.

Kitts, Paul, "Chapter 14: Genome Assembly and Annotation Process," The NCBI Handbook, Oct. 2002, pp. 1-21.

"The FASTA Program Package," fasta—36.3.4, Mar. 25, 2011, pp. 29.

Wollrath et al., "A Distributed Object Model for the Java System," Proceedings of the 2nd Conference on USENEX, Conference on Object-Oriented Technologies (COOTS), Jun. 17, 1996, pp. 219-231.

Madden, Tom, "Chapter 16: The BLAST Sequence Analysis Tool," The NCBI Handbook, Oct. 2002, pp. 1-15.

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.

Palantir, "Extracting and Transforming Data with Kite," Palantir Technologies, Inc., Copyright 2010, pp. 38.

Palermo, Christopher J., "Memorandum," [Disclosure relating to U.S. Appl. No. 13/916,447, filed Jun. 12, 2013, and related applications], Jan. 31, 2014 in 3 pages.

Palmas et al., "An Edge-Bunding Layout for Interactive Parallel Coordinates" 2014 IEEE Pacific Visualization Symposium, pp. 57-64.

Vose et al., "Help File for ModelRisk Version 5," 2007, Vose Software, pp. 349-353. [Uploaded in 2 Parts].

Manske, "File Saving Dialogs," <http://www.mozilla.org/editor/ui_specs/FileSaveDialogs.html>, Jan. 20, 1999, pp. 7.

Johnson, Maggie, "Introduction to YACC and Bison".

Gorr et al., "Crime Hot Spot Forecasting: Modeling and Comparative Evaluation", Grant 98-IJ-CX-K005, May 6, 2002, 37 pages.

Apsalar, "Data Powered Mobile Advertising," "Free Mobile App Analytics" and various analytics related screen shots <http://apsalar.com> Printed Jul. 18, 2013 in 8 pages.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Morrison et al., "Converting Users to Testers: An Alternative Approach to Load Test Script Creation, Parameterization and Data Corellation," CCSC: Southeastern Conference, JCSC 28, Dec. 2, 2012, pp. 188-196.

Yang et al., "HTML Page Analysis Based on Visual Cues", A129, pp. 859-864, 2001.

Li et al., "Interactive Multimodal Visual Search on Mobile Device," IEEE Transactions on Multimedia, vol. 15, No. 3, Apr. 1, 2013, pp. 594-607.

Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.

Zaharia et al., "Resilient Distributed Datasets: A Fault-Tolerant Abstraction for In-Memory Cluster Computing" dated 2012, 14 pages.

Olanoff, Drew, "Deep Dive with the New Google Maps for Desktop with Google Earth Integration, It's More than Just a Utility," May

(56) References Cited

OTHER PUBLICATIONS 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palantir Technologies, "Palantir Labs—Timeline," Oct. 1, 2010, retrieved from the internet https://www.youtube.com/watch?v=JCgDW5bru9M retrieved on Aug. 19.
Griffith, Daniel A., "A Generalized Huff Model," Geographical Analysis, Apr. 1982, vol. 14, No. 2, pp. 135-144.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-c553-ui-20120117/#resizing-amp-overflow retrieved on May 18, 2015.
Valentini et al., "Ensembles of Learning Machines", M. Marinaro and R. Tagliaferri (Eds.): WIRN VIETRI 2002, LNCS 2486, pp. 3-20.
Anonymous, "BackTult—JD Edwards One World Version Control System," printed Jul. 23, 2007 in 1 page.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.
Delicious, <http://delicious.com/> as printed May 15, 2014 in 1 page.
Definition "Overlay", downloaded Jan. 22, 2015, 1 page.
Dean et al., "MapReduce: Simplified Data Processing on Large Clusters", OSDI 2004, 13 pages.
Manno et al., "Introducing Collaboration in Single-user Applications through the Centralized Control Architecture," 2010, pp. 10.
Wang et al., "Research on a Clustering Data De-Duplication Mechanism Based on Bloom Filter," IEEE 2010, 5 pages.
Pythagoras Communications Ltd., "Microsoft CRM Duplicate Detection," Sep. 13, 2011, https://www.youtube.com/watch?v=j-7Qis0D0Kc.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10.
Keylines.com, "KeyLines Datasheet," Mar. 2014, <http://keylines.com/wp-content/uploads/2014/03/KeyLines-datasheet.pdf> downloaded May 12, 2014 in 2 pages.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Umagandhi et al., "Search Query Recommendations Using Hybrid User Profile with Query Logs," International Journal of Computer Applications, vol. 80, No. 10, Oct. 1, 2013, pp. 7-18.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Thompson, Mick, "Getting Started with GEO," Getting Started with GEO, Jul. 26, 2011.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.

Hibbert et al., "Prediction of Shopping Behavior Using a Huff Model Within a GIS Framework," Healthy Eating in Context, Mar. 18, 2011, pp. 16.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Symantec Corporation, "E-Security Begins with Sound Security Policies," Announcement Symantec, Jun. 14, 2001.
Google Analytics Official Website—Web Analytics & Reporting, <http://www.google.com/analytics.index.html> Printed Jul. 18, 2013 in 22 pages.
"A First Look: Predicting Market Demand for Food Retail using a Huff Analysis," TRF Policy Solutions, Jul. 2012, pp. 30.
Miklau et al., "Securing History: Privacy and Accountability in Database Systems," 3 rd Biennial Conference on Innovative Data Systems Research (CIDR), Jan. 7-10, 2007, Asilomar, California, pp. 387-396.
Wikipedia, "Multimap," Jan. 1, 2013, https://en.wikipedia.org/w/index.php?title=Multimap&oldid=530800748.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Hansen et al., "Analyzing Social Media Networks with NodeXL: Insights from a Connected World", Chapter 4, pp. 53-67 and Chapter 10, pp. 143-164, published Sep. 2010.
Glaab et al., "EnrichNet: Network-Based Gene Set Enrichment Analysis," Bioinformatics 28.18 (2012): pp. i451-i457.
Piwik—Free Web Analytics Software. <http://piwik.org/> Printed Jul. 19, 2013 in18 pages.
Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.
Definition "Identify", downloaded Jan. 22, 2015, 1 page.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Jelen, Bill, "Excel 2013 in Depth, Video Enhanced Edition," Jan. 25, 2013.
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-.
"A Quick Guide to UniProtKB Swiss-Prot & TrEMBL," Sep. 2011, pp. 2.
Localytics—Mobile App Marketing & Analytics, <http://www.localytics.com/> Printed Jul. 18, 2013 in 12 pages.
Hua et al., "A Multi-attribute Data Structure with Parallel Bloom Filters for Network Services", HiPC 2006, LNCS 4297, pp. 277-288, 2006.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Quest, "Toad for ORACLE 11.6—Guide to Using Toad", pp. 1-162, Sep. 24, 2012.
Capptain—Pilot Your Apps, <http://www.capptain.com> Printed Jul. 18, 2013 in 6 pages.
Palantir, "Kite Data-Integration Process Overview," Palantir Technologies, Inc., Copyright 2010, pp. 48.
Johnson, Steve, "Access 2013 on demand," Access 2013 on Demand, May 9, 2013, Que Publishing.
Rouse, Margaret, "OLAP Cube," <http://searchdatamanagement.techtarget.com/definition/OLAP-cube>, Apr. 28, 2012, pp. 16.
Goswami, Gautam, "Quite Writly Said!," One Brick at a Time, Aug. 21, 2005, pp. 7.
Conner, Nancy, "Google Apps: The Missing Manual," May 1, 2008, pp. 15.

(56) References Cited

OTHER PUBLICATIONS

StatCounter—Free Invisible Web Tracker, Hit Counter and Web Stats, <http://statcounter.com/> Printed Jul. 19, 2013 in 17 pages.
UserMetrix, <http://usermetrix.com/android-analytics> printed Jul. 18, 2013 in 3 pages.
Osterweil et al., "Capturing, Visualizing and Querying Scientific Data Provenance", http://www.mtholyoke.edu/-blerner/dataprovenance/ddg.html, dated May 20, 2015, 3 pages.
Palantir, https://docs.palantir.com/gotham/3.11.1.0/dataguide/baggage/KiteSchema.xsd printed Apr. 4, 2014 in 4 pages.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Nierman, "Evaluating Structural Similarity in XML Documents", 6 pages, 2002.
Cohn, et al., "Semi-supervised clustering with user feedback," Constrained Clustering: Advances in Algorithms, Theory, and Applications 4.1 (2003): 17-32.
"A Word About Banks and the Laundering of Drug Money," Aug. 18, 2012, http://www.golemxiv.co.uk/2012/08/a-word-about-banks-and-the-laundering-of-drug-money/.
Klemmer et al., "Where Do Web Sites Come From? Capturing and Interacting with Design History," Association for Computing Machinery, CHI 2002, Apr. 20-25, 2002, Minneapolis, MN, pp. 8.
Microsoft Office—Visio, "About connecting shapes," <http://office.microsoft.com/en-us/visio-help/about-connecting-shapes-HP085050369.aspx> printed Aug. 4, 2011 in 6.
Map of San Jose, CA. Retrieved Oct. 2, 2013 from http://maps.yahoo.com.
trak.io, <http://trak.io/> printed Jul. 18, 2013 in 3 pages.
Boyce, Jim, "Microsoft Outlook 2010 Inside Out," Aug. 1, 2010, retrieved from the internet https://capdtron.files.wordpress.com/2013/01/outlook-2010-inside_out.pdf.
Wikipedia, "Federated Database System," Sep. 7, 2013, retrieved from the internet on Jan. 27, 2015 http://en.wikipedia.org/w/index.php?title=Federated database system&oldid=5719542.
Gu et al., "Record Linkage: Current Practice and Future Directions," Jan. 15, 2004, pp. 32.
Palantir, "Kite," https://docs.palantir.com/gotham/3.11.1.0/adminreference/datasources.11 printed Aug. 30, 2013 in 2 pages.
Hur et al., "SciMiner: web-based literature mining tool for target identification and functional enrichment analysis," Bioinformatics 25.6 (2009): pp. 838-840.
Flurry Analytics, <http://www.flurry.com/> Printed Jul. 18, 2013 in 14 pages.
Nivas, Tuli, "Test Harness and Script Design Principles for Automated Testing of non-GUI or Web Based Applications," Performance Lab, Jun. 2011, pp. 30-37.
Huff et al., "Calibrating the Huff Model Using ArcGIS Business Analyst," ESRI, Sep. 2008, pp. 33.
Acklen, Laura, "Absolute Beginner's Guide to Microsoft Word 2003," Dec. 24, 2003, pp. 15-18, 34-41, 308-316.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
TestFlight—Beta Testing on the Fly, <http://testflightapp.com/> Printed Jul. 18, 2013 in 3 pages.
DISTIMO—App Analytics, <http://www.distimo.com/app-analytics> Printed Jul. 18, 2013 in 5 pages.
Kontagent Mobile Analytics, <http://www.kontagent.com/> Printed Jul. 18, 2013 in 9 pages.
Chaudhuri et al., "An Overview of Business Intelligence Technology," Communications of the ACM, Aug. 2011, vol. 54, No. 8.
Palantir, "The Repository Element," https://docs.palantir.com/gotham/3.11.1.0/dataguide/kite_config_file.04 printed August.
Huff, David L., "Parameter Estimation in the Huff Model," ESRI, ArcUser, Oct.-Dec. 2003, pp. 34-36.
Palantir, "Kite Operations," Palantir Technologies, Inc., Copyright 2010, p. 1.
Palantir, https://docs.palantir.com/gotham/3.11.1.0/dataguide/baggage/KiteSchema printed Aug. 30, 2013 in 1 page.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Delcher et al., "Identifying Bacterial Genes and Endosymbiont DNA with Glimmer," BioInformatics, vol. 23, No. 6, 2007, pp. 673-679.
Countly Mobile Analytics, <http://count.ly/> Printed Jul. 18, 2013 in 9 pages.
AMNET, "5 Great Tools for Visualizing Your Twitter Followers," posted Aug. 4, 2010, http://www.amnetblog.com/component/content/article/115-5-grate-tools-for-visualizing-your-twitter-followers.html.
APPACTS, "Smart Thinking for Super Apps," <http://www.appacts.com> Printed Jul. 18, 2013 in 4 pages.
Sigrist, et al., "PROSITE, a Protein Domain Database for Functional Characterization and Annotation," Nucleic Acids Research, 2010, vol. 38, pp. D161-D166.
Kokossi et al., "D7-Dynamic Ontoloty Management System (Design)," Information Societies Technology Programme, Jan. 10, 2002, pp. 1-27.
Niepert et al., "A Dynamic Ontology for a Dynamic Reference Work", Joint Conference on Digital Libraries, pp. 1-10, Vancouver, British Columbia, Jun. 17-22, 2007.
Bluttman et al., "Excel Formulas and Functions for Dummies," 2005, Wiley Publishing, Inc., pp. 280, 284-286.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Zheng et al., "GOEAST: a web-based software toolkit for Gene Ontology enrichment analysis," Nucleic acids research 36.suppl 2 (2008): pp. W385-W363.
Map of San Jose, CA. Retrieved Oct. 2, 2013 from http://maps.google.com.
Palantir, "Write a Kite Configuration File in Eclipse," Palantir Technologies, Inc., Copyright 2010, pp. 2.
European Patent Office, "Search Report" in application No. 18175417.7-1217, dated Aug. 13, 2018, 8 pages.
European Claims in application No. 18175417.7-1217, dated Aug. 2018, 4 pages.

\* cited by examiner

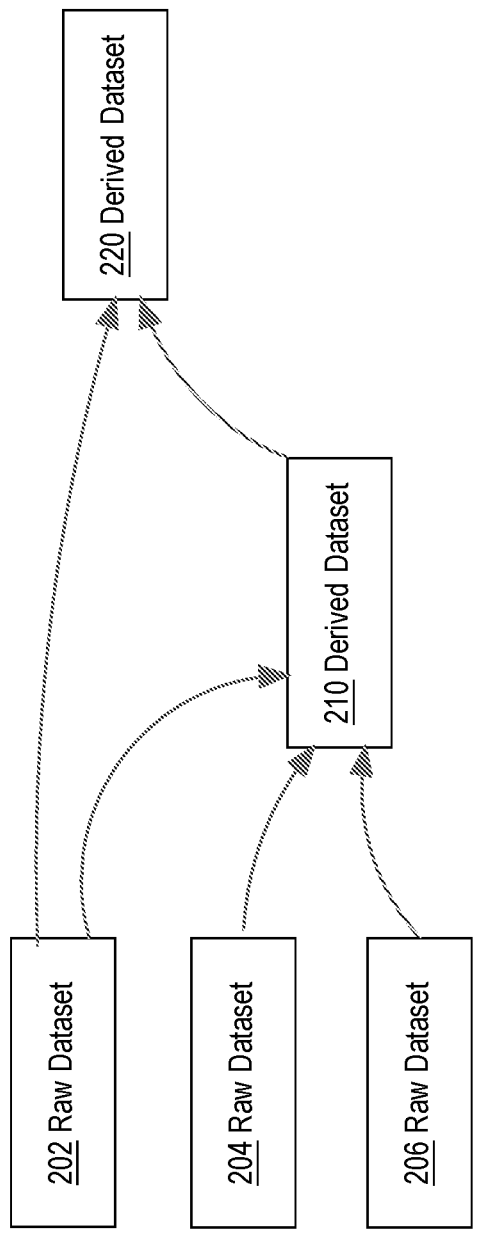

PROPAGATED DELETION OF DATABASE RECORDS AND DERIVED DATA

BENEFIT CLAIM

This application claims the benefit under 35 U.S.C. 119(e) of provisional application 62/518,421, filed Jun. 12, 2017, the entire contents of which are hereby incorporated by reference as if fully set forth herein.

FIELD OF THE DISCLOSURE

The present disclosure relates to computer-implemented distributed database systems. More specifically, the example embodiment(s) described below relate to computer-implemented techniques for complete deletion of data across replicated or related datasets or data storage systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In many kinds of computer systems, issuing a command to delete a data value, record, file or other dataset does not actually result in destruction, obliteration, or over-writing the dataset. Instead, the dataset is marked as deleted using a flag or other metadata, and an operating system or other access control logic makes the unit unavailable to programs or processes acting at a particular logical level. However, the dataset remains available to administrative systems or other programs or processes that have special access privileges, at least until the dataset is actually overwritten by the normal operation of the computer system.

However, the legal systems of certain jurisdictions require enterprises that store data, in response to certain kinds of requests to delete or remove data, to provide assurance that all copies of the data have been actually erased, overwritten, obliterated, removed or otherwise made totally inaccessible. Compliance with such a requirement is difficult when enterprises use distributed database systems with redundant data storage, fault-tolerant devices, tiered or hierarchical data architectures, or storage of subsets of data in different locations.

Furthermore, some databases observe the property of object immutability, meaning that stored data objects cannot be modified once they are created. These databases have a total data size that is constantly growing and may include many outdated datasets that once had usefulness but later merely occupy space and have limited value. Achieving assured deletion of data in these architectures is a significant challenge.

Thus, there is a need for a computer system that is capable of actual deletion of all copies of data in a distributed system, wherever they are stored.

SUMMARY

The appended claims may serve to summarize the disclosure.

BRIEF DESCRIPTION OF THE DRAWINGS

In the drawings:

FIG. 2 illustrates an example graph of relationships between three raw datasets and two derived datasets.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Embodiments are described in sections below according to the following outline:
GENERAL OVERVIEW
DISTRIBUTED DATABASE SYSTEM OVERVIEW
EXAMPLE PROCESS OF PROPAGATED ASSURED DATA DELETION
IMPLEMENTATION EXAMPLE—HARDWARE OVERVIEW
IMPLEMENTATION EXAMPLE—BASIC SOFTWARE SYSTEM
EXTENSIONS AND ALTERNATIVES

General Overview

Techniques for propagation of deletion operations among a plurality of related datasets are described herein. In an embodiment, a data processing method comprises, using a distributed database system that is programmed to manage a plurality of different raw datasets and a plurality of derived datasets that have been derived from the raw datasets based on a plurality of derivation relationships that link the raw datasets to the derived datasets: from a first dataset that is stored in the distributed database system, determining a subset of records that are candidates for propagated deletion of specified data values; determining one or more particular raw datasets that contain the subset of records; deleting the specified data values from the particular raw datasets; based on the plurality of derivation relationships and the particular raw datasets, identifying one or more particular derived datasets that have been derived from the particular raw datasets; generating and executing a build of the one or more particular derived datasets to result in creating and storing the one or more particular derived datasets without the specified data values that were deleted from the particular raw datasets; repeating the generating and executing for all derived datasets that have derivation relationships to the particular raw datasets; wherein the method is performed using one or more processors.

Distributed Database System Overview

Figure 1:
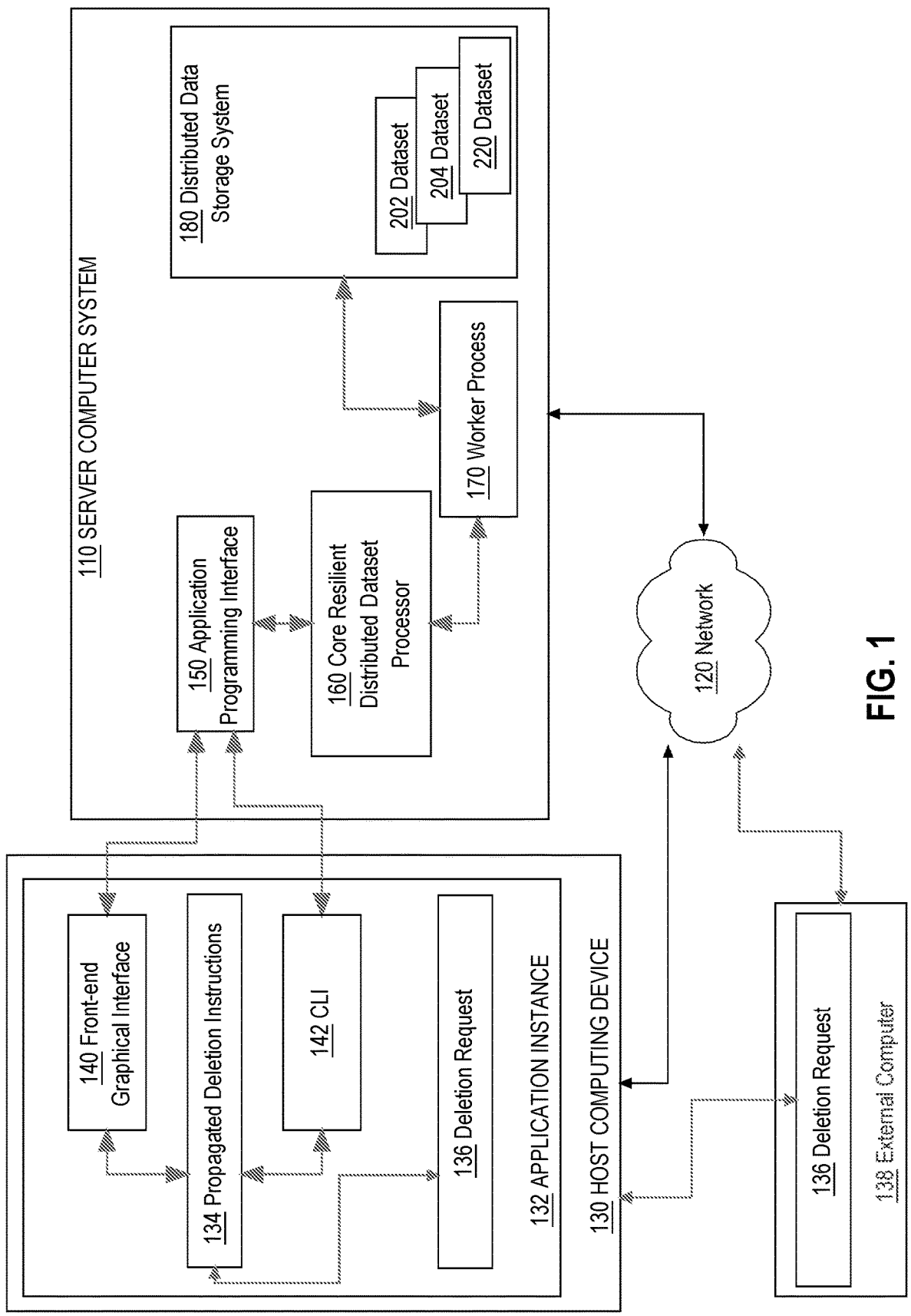
FIG. 1 illustrates a distributed computing system with which embodiments may be implemented.

FIG. 1 illustrates a distributed computing system with which embodiments may be implemented.

In an embodiment, a distributed computing system comprises a server computer ("server") 110 that is coupled via network 120 to a host computing device 130. The distributed computing system can be within one or more data centers, virtual computing facilities or other hosting facilities; other embodiments can be within a networked home, office, or campus.

Network 120 broadly represents a combination of one or more local area networks, wide area networks and internetworks and may include the public internet. The network 120 can connect one or more instances of the host 130, server 110 and an external computer 138 together within the distributed computing environment. Network 120 can be composed of multiple sub-networks that are coupled. For example, the network 120 can be an Internet Protocol Version 4-based and/or an Internet Protocol Version 6-based wired or wireless network or a combination of multiple such networks.

Host computing device 130 broadly represents one or many computers and the number of hosts 130 in the system at a given time may vary in different embodiments and any number may be used. In an embodiment, a host 130 can be a single computing device such as computing device 400 that is described below with respect to FIG. 4. Alternatively, a host can be a single virtual computer instance that executes on a computing device facilitated by a virtualization layer (e.g., a Type 1 or Type 2 hypervisor) interposed between the virtual computer instance and the computing device. The virtualization layer can be a virtual machine monitor such as, for example, virtual machine monitor 530 described below with respect to FIG. 5.

Regardless if a single computing device or a single virtual computer instance, a host 130 can be configured with an operating system (e.g., UNIX, LINUX, MACOS, WINDOWS) as illustrated, for example, by operating system 510 described below with respect to FIG. 5. The operating system of a host 130 can manage low-level aspects of the host's operation including managing execution of processes, memory allocation, file input and output (I/O), and device I/O. Furthermore, the operating system of host 130 may manage presentation systems such as a windowed graphical user interface (GUI) and driving a computer display device such as a flat screen display or CRT. A host 130 may also be configured with a container system (e.g., the DOCKER container system) for running services 134 within containers on the host's operating system.

Services that execute as processes on hosts in the distributed computing environment may be configured using the distributed configuration platform described herein or in application Ser. No. 14/284,959, filed Oct. 4, 2016, the entire contents of which is hereby incorporated by reference as if fully set forth herein.

In an embodiment, host 130 comprises an application instance 132 which allows one or more services to be deployed on host 130 from one or more server computing devices, such as server 110. In an embodiment, application instance 132 comprises propagated deletion instructions 134, a front-end graphical interface 140 or a command-line interface (CLI) 142 that may interoperate to provide the functions that are described further herein. In an embodiment, the front-end interface 140 and CLI 142 are programmed or configured to interact with one or more server-side functional units of server computer 110 as further described. Host computing device 130 also manages one or more deletion requests 136 using processes that are further described in other sections.

A service that application instance 132 facilitates or hosts can be a single instance of a software product or software application installed on at least one of the hosts 130. For example, a service might be a database server instance, a web server instance, or any other instance of a software product or a software application installed on one or more of the hosts 130. Multiple different services may be installed on the hosts 130 including multiple different services on the same host 130. For example, a service may be installed on multiple of the hosts 130 in a distributed, clustered, load balanced, or failover computing arrangement.

In some embodiments, the external computer 138 is associated with an account or user unrelated to the host computing device 130 and/or server computing system 110. For example, host computing device 130 may represent a computer that is associated with an administrative user of an enterprise that also owns and operates the server 110, and external computer 138 may be associated with an independent party.

In an embodiment, server 110 comprises an application programming interface (API) 150, a core resilient distributed dataset (RDD) processor 160, one or more worker processes 170, and a distributed data storage system 180 that stores, for example, datasets 202, 204, 220 as further described. In an embodiment, API 150 is programmed or configured to receive electronic digital messages that define database operations according to a structured query language, parse the messages to determine the operations, and instruct the core RDD processor 160 to execute the operations. Typically execution of the operations causes instructing one or more worker processes 170 to execute builds of derived datasets, based on raw datasets, with distributed data storage system 180. In this context, a dataset may be termed a raw dataset when data in the dataset has been originally created by a service, or received from a source of data prior to any filtering, joining or other transformation. An example is daily web log data for web services. A dataset may be deemed raw in the sense that a program or transformation operation is not executed to produce versions or transformations of the dataset. In contrast, if a program or process computes a join between datasets A and B, resulting in dataset C, then dataset C is a derived dataset because it is derived from one or more other dataset versions. Joins, filters, calculations resulting in updates of fields or records, or other modifications or transformations to result in derived datasets may be performed in a database system, an Apache Spark system, a data repository that is programmed to perform merges, or any other program or system. In one implementation, API 150 comprises an executable instance of SPARK SQL; the core RDD processor 160 is an executable instance of the SPARK Core; and distributed database system 180 may be an executable instance of a HADOOP file system or a hierarchical distributed database server that implements object immutability.

In general, API 150 provides a flexible and efficient way to indirectly specify rows in a database to be acted upon, with the security of not explicitly transmitting row identifiers across a network connection, but its use is optional and other ways of specifying or identifying rows could be used in other embodiments. For example, as an alternative to an SQL query, a set of explicit row identifiers may be cryptographically hashed using SHA-256 or another hash algorithm and the resulting hash strings may be transmitted in a request to the processor 160. The processor 160 then may command worker process 170 to compare the hash string values to an index of previously prepared hash string values of rows of datasets in the distributed data storage system 180, and then delete rows where a hash match is found. Both the SQL approach and hash approach have the benefit of avoiding transmission of an explicit row identifier, which could be recorded in a log file or otherwise stored in an unanticipated manner.

In an embodiment, each of the propagated deletion instructions 116, API 150, core RDD processor 160, worker process 170, and distributed data storage system 180 comprises a set of one or more pages of main memory, such as RAM, in the host computer 130 or server 110 into which executable instructions have been loaded and which when executed cause each respective computer to perform the functions or operations that are described herein with reference to those functional units. For example, the propagated deletion instructions 116 may comprise a set of pages in RAM that contain instructions which when executed cause performing the hard delete functions that are further described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, each of the aforementioned instructions also may represent one or more files or projects of source code that are digitally stored in a mass storage device such as non-volatile RAM or disk storage, in the server 110 or a separate repository system, which when compiled or interpreted cause generating executable instructions which when executed cause the server 110 to perform the functions or operations that are described herein with reference to those modules. The specific manner in which programmers or software developers organize and arrange source code for later compilation into an executable, or interpretation into bytecode or the equivalent, for execution by the server 110 or host computing device 130, is not critical.

Example Process of Propagated Deletion of Database Records and Derived Data

FIG. 2 illustrates an example graph of relationships between three raw datasets and two derived datasets.

In the example of FIG. 2, three (3) raw datasets 202, 204, 206 are stored using the distributed database system 180. In one implementation, datasets in FIG. 2 may represent tables of a relational database system and/or materialized views that are derived from the tables. All the datasets 202, 204, 206 contribute, according to a first derivation function or relationship, to a first derived dataset 210 as indicated by arrows connecting the datasets 202, 204, 206 to the first derived dataset 210. Furthermore, a first raw dataset 202 and the first derived dataset 210 contribute, based on a second derivation function or relationship, to a second derived dataset 220. Therefore, the five (5) datasets 202, 204, 206, 210, 220 are arranged in a directed graph in which datasets are nodes and derivation functions or relationships comprise paths. Derivation functions or relationships may specify transformations or access controls such as removal of columns or rows, reordering of columns, or other operations.

FIG. 2 illustrates five (5) datasets in one arrangement of a graph merely to indicate a clear example and not as a requirement or limitation. Other embodiments may include any number of raw datasets and/or derived datasets arranged in graphs of any level of complexity limited only by available memory, storage and/or processing power of the computing instances that are used in a deployment. Furthermore, the graph view of FIG. 2 may represent a visualization, for human convenience, of digitally stored metadata that represents nodes and links of the datasets that are shown. In other words, storing metadata about nodes and links is sufficient to support the traversal or determination of relationships as further described herein, and actual storage of a graphical image is not required.

In an embodiment, the propagated deletion instructions 134 are programmed or configured to cause receiving and processing a deletion request 136, through the front-end graphical interface 140 or CLI 142, and to instruct, message or signal the API 150 with data that is sufficient to define how to obtain or retrieve one or more raw datasets 202, 204 and/or derived datasets 220 using distributed data storage system 180. The propagated deletion instructions 134 are further programmed to cause the API 150 to perform specified update operations on the raw datasets that result in deletion of specified datasets, rows, columns or cells, and to instruct the core RDD processor to initiate one or more build operations that automatically cause propagating the updates and deletions downstream to derived datasets 220 that have the raw datasets 202, 204 as sources.

Figure 3A:
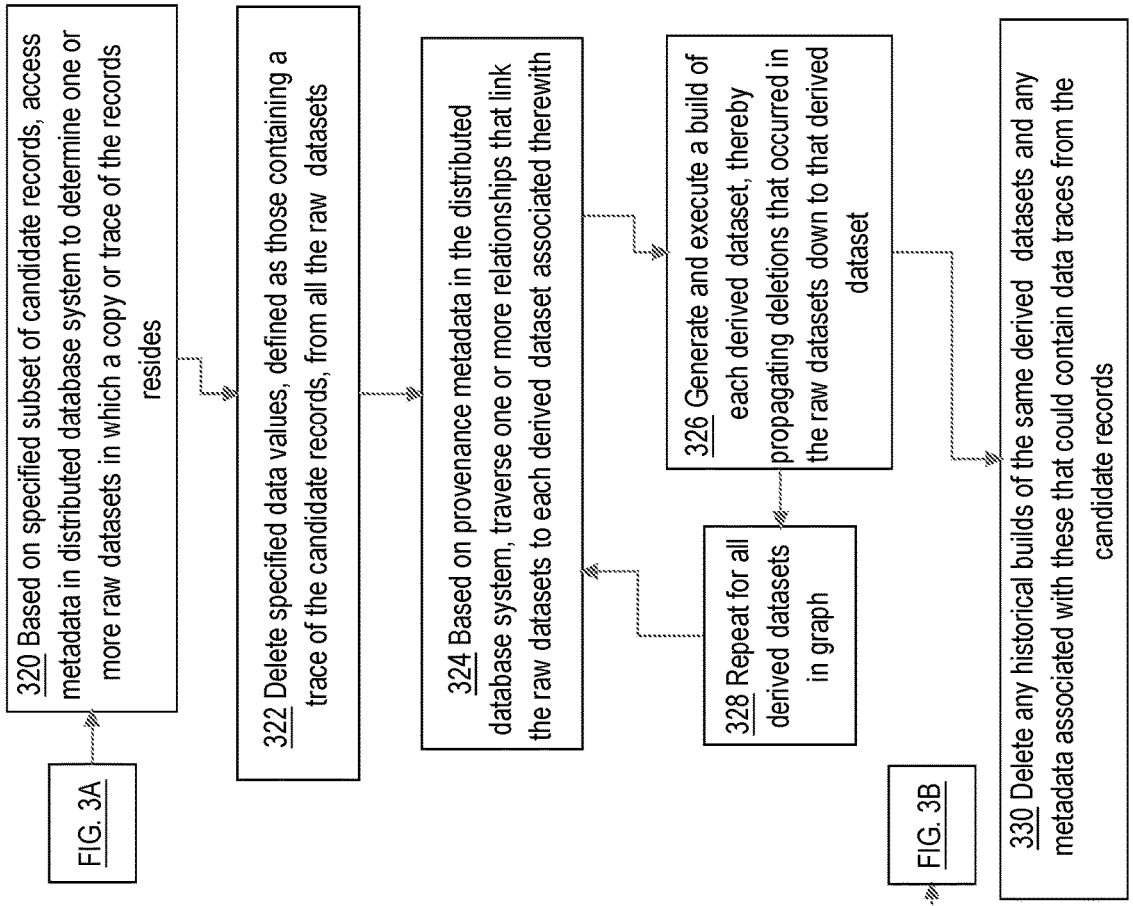
FIG. 3A illustrates a method of managing requests to delete data and initiating builds of deleted data.
Figure 3B:
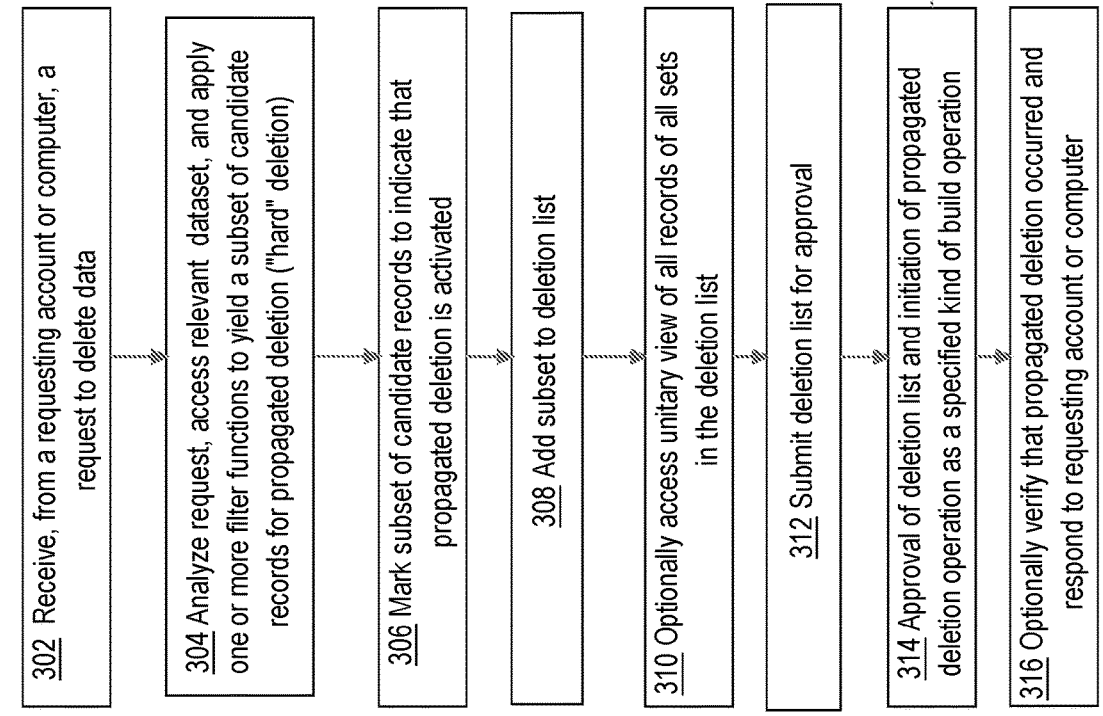
FIG. 3B illustrates a process of propagated assured deletion of data in a distributed database system.

FIG. 3A illustrates a method of managing requests to delete data and initiating builds of deleted data. FIG. 3B illustrates a process of propagated assured deletion of data in a distributed database system.

Each of FIG. 3A, FIG. 3B and any other flow diagram or process description in this disclosure is intended to represent an algorithm or plan for programming computer programs at the same level of detail that skilled persons in this field use to communicate among themselves about the architecture, process or data flow, arrangement, ordering and content of similar computer programs of similar types. That is, the flow diagrams and process descriptions are presented at a level of detail that skilled persons in this field have determined to be sufficient to communicate between themselves the baseline information that is adequate to permit the coding, completion, testing and deployment of computer programs that will execute and operate to provide the functions that are described herein.

The process of FIG. 3A describes certain data input, selection, display, workflow, approval, and other operations that could be implemented in the system of FIG. 1, but are not required in all embodiments. For example, there is no requirement to use a GUI, or to implement a workflow with approval steps, or other operations that are indicated as optional. Instead, the process of FIG. 3A could be modified to implement only identification of a dataset or subset of records for which propagated deletion is needed, and to signal or command such deletion to start using the steps of FIG. 3B. Or, propagated deletion instructions 134 or a compatible script, cron job or control program may automate a set of deletion operations that are usefully executed on a repetitive basis; for example a script could specify a particular set of data to be deleted every 6 months and submit a deletion request 136 with those parameters using a programmatic call.

Referring FIG. 3A in substance, in block 302, a request to delete data is received from a requesting account or computer. For example, host computing device 130 creates via user input, or a programmatic call from application instance 132 or an external system or program, a deletion request 136 and transmits the deletion request to the propagated deletion instructions. Alternatively, external computer 138 may transmit the deletion request 136 to the host computing instance 130. Transmission may occur via e-mail, messaging systems, or programmatic calls. Creating a deletion request 136 also may be performed using the front-end graphical interface 140, which may be programmed to provide forms, GUI widgets, or other facilities to specify what data is to be deleted. Or, as noted in the preceding paragraph, the deletion request 136 may be received as a programmatic call from a script, control program or other system that operates according to a schedule using specified parameters.

In block 304, the process is programmed to analyze the request, access a relevant dataset, and apply one or more filter functions to yield a subset of candidate records for propagated deletion. Propagated deletion or hard deletion refers, in this disclosure, to automatic computer-implemented processes to delete specified data items from raw datasets, from all derived datasets that are based on the raw datasets, and from all historical or related builds of the derived datasets. Hard deletion of data may mean that the information represented within the data is not physically or electronically recoverable. Accessing a relevant dataset may comprise receiving input at the host computing device 130 that specifies opening or viewing a named dataset that is maintained in distributed data storage system 180. To obtain the view, the front-end interface 140 may transmit a SQL query to the API 150 and receive a result set of records.

Applying filter functions may be performed via user manipulation of GUI widgets, providing keyboard input, and other commands in the front-end graphical interface 140. For example, input may specify adding a first filter that identifies personal information for a specified person, and adding a second filter that specifies a date range. Collectively, applying these filters results in forming a subset of candidate records for hard deletion and may also cause displaying a table view or row view of the candidate records.

In block 306, the process is programmed to mark the subset of candidate records to indicate that propagated deletion is activated. In one embodiment, marking records to activate propagated deletion comprises selecting a set of records that are displayed in the GUI of front-end graphical interface 140 using a pointing device, and selecting a GUI switch widget. For example, the display may provide a HARD DELETE GUI widget with an ON and OFF position that can be selected to indicate applying propagated deletion to the selected records.

In block 308, the process is programmed to add the subset to a deletion list. In one embodiment, using front-end graphical interface 140, the subset may be associated with a name or label value and then added to a deletion list consisting of a set of such names or label values. The use of a deletion list provides a way to associate a batch of relatively smaller or discrete propagated deletion requests into a larger job or group that is capable of concurrent review in an approval workflow. Thus, the deletion list acts as a queue or shopping cart of multiple subsets of different candidate records. The deletion list may be maintained at the host computing device 130 and managed by the propagated deletion instructions 134 or in storage of server computer 110.

At block 310, the process is programmed to optionally provide access to a unitary view of all records of all sets in the deletion list. For example, in one embodiment, front-end graphical interface 140 is programmed to enable displaying all records of all subsets that are named, labeled or otherwise represented in the deletion list. This approach provides a way to rapidly re-check different subsets of records that have been selected and added to the deletion list.

At block 312, the process is programmed to submit the deletion list for approval to another computer, account or user, as part of a defined workflow for approval of hard deletion operations. The second administrator computer or account may be associated with a person who has authority to approve hard deletion of the records specified in the deletion list. In an embodiment, front-end graphical interface 140 displays a SUBMIT button, icon or widget which, when selected, causes transmitting a message or notification to another computer indicating that the deletion list is ready for review.

In block 314, the process is programmed to receive a message, signal or other indication that the deletion list is approved, and initiation of a propagated deletion operation as a specified kind of build operation. Control may transfer to the process of FIG. 3B to execute these operations. Block 314 may involve, for example, a different administrative account accessing the deletion list from a different computer, obtaining the unitary display of block 310, and selecting a button, icon or other widget to indicate approval and initiation of propagated deletion operations of the kind described for FIG. 3B.

At block 316, the process is programmed to optionally allow verification that a propagated deletion occurred correctly, and to respond to the requesting account or computer. In an embodiment, the effect of the hard delete operation can be assessed by accessing the database to apply the same filters as before, which now will yield zero results. Furthermore, front-end graphical interface 140 may provide an interface to an e-mail system or other messaging system that allows transmitting an acknowledgment, confirmation or other message to the external computer 138 if it was the source of the deletion request 136. Alternatively, a programmatic response to a calling process may be provided, if such a process was the source of the deletion request 136. Or, an e-mail message may be sent within an organization that includes both the host computing device 130 and the server computer 110 to specify that the deletion completed.

Referring now to FIG. 3B, at block 320 the process is programmed, based on the specified subset of candidate records, to access metadata in the distributed database system to determine one or more raw datasets in which the records reside. For example, if deletion request 136 effectively communicates "DELETE ALL RECORDS OF JANE DOE DATED EARLIER THAN 6 MONTHS AGO," and the process of FIG. 3A results in identifying a count of "36" records that need to be deleted across a plurality of different raw datasets that matched queries in the system, there is a need to identify every raw dataset that contains one of the "36" records. Identification may use label values carried in the records that were identified or other metadata from distributed data storage system 180.

At block 322, the process is programmed to delete the specified records from all the raw datasets that were identified at block 320. In one embodiment, deleting data from raw datasets may involve operations on files that are external to database 180, such as deleting rows in CSV files from which data was imported. In an embodiment, propagated deletion instructions 134 form and transmit one or more SQL queries to API 150 that specify updates to the raw datasets that were identified. The API 150 transforms these queries into instructions to the core RDD processor 160, which instructs the worker process 170 to perform updates to the raw datasets at the distributed data storage system 180. Or, when raw datasets are in an external database source such as a HADOOP (HDFS) store, block 322 can comprise generating and transmitting a programmatic call with sufficient credentials to authenticate or authorize the call, or to log in to the external system, and accomplish a deletion there. In still another alternative, deletion can comprise requesting the worker process 170 to contact an elastic search system to update an index in cases in which data was exported to those systems, as specified in metadata.

In an embodiment, using SPARK SQL, the API 150 and core RDD processor 160 accept arbitrary changes to any number of raw datasets, as specified by requests from clients such as interface 140 or CLI 142. This enables the system to carry out deletions and edits at the dataset level, row level, column level or cell level.

In block 324, the process is programmed, based on provenance metadata that is managed in the distributed database system, to traverse relationships that link the raw datasets to one or more derived datasets, reaching each derived dataset associated with the raw datasets. In some embodiments, the provenance metadata is maintained within a derived dataset. That is, a derived dataset may specify, in metadata, which raw datasets it is based on, so that traversal may comprise searching the metadata or loading successive derived datasets based on name, timestamp or other values until a relationship to a raw dataset is identified. Or, the provenance data may be managed in separate metadata tables or files. As an example of its use, once the raw datasets containing the "36" records have been identified, propagated deletion instructions 134 may transmit other SQL queries to the server 110 to retrieve identifying information for all derived datasets that have derivation relationships to the raw datasets.

As a derived dataset is identified via the relationships in response to the queries, at block 326 the process is programmed to generate and execute a build of each derived dataset. A "build" operation, in this context, may mean a software process or thread, which can execute in parallel with many other similar operations, that causes interpreting a set of deletion instructions. A build may comprise re-materializing derived tables. A build, with this approach, avoids potentially creating tables with null values that cannot be resolved after prior deletion of a related row. The build operation reaches a complete state when all relevant records are deleted. For example, based on result messages that identify a derived dataset, the propagated deletion instructions 134 are programmed to form further update queries to API 150 that cause the core RDD processor 160 and worker process 170 to initiate new builds of the derived dataset from the raw dataset from which data has just been deleted. Consequently, upon completion of a build, the new derived dataset omits the data that was just deleted from the raw dataset from which the derived dataset has been built. Therefore, the result of executing such builds is to propagate deletions that occurred in the raw datasets to each derived dataset, automatically under program control, creating derived datasets that also lack the data that was deleted in the raw datasets.

As seen at block 328, these operations are repeated for all derived datasets in the graph. Block 328 may represent programmatic tests to identify the next derived dataset via metadata in the distributed data storage system 180 that represents a graph like that of FIG. 2, or another form of graph. In effect, blocks 326, 328 cause a traversal of such a graph to identify and rebuild, without deleted data, all derived datasets that have relationships to the raw datasets from which data was deleted.

Furthermore, as in the case of deleting data from raw datasets at block 322, processing derived datasets at blocks 324, 326 also may include determining from the provenance metadata that operations outside the database system 180 are required, for example using flat CSV files in a filesystem or HDFS records. In an embodiment, as part of blocks 324, 326, 328, inspection of metadata and relationships of raw or derived datasets may indicate that a particular raw dataset or derived dataset was exported outside the distributed database system 180. For example, a particular dataset may have been transmitted in native format to another instance of the system, or exported as a comma-separated value (CSV) file to a host computer, or otherwise transformed into a different format and copied out of the system. When metadata indicates an export, the process of FIG. 3B may be programmed to generate an alert or notification so that an account or user becomes aware that other steps may need to be taken, outside the scope of FIG. 3A, FIG. 3B, to fully delete all copies of relevant data. Or, if the dataset location is in a known external system such as HDFS and login or authentication credentials are available in storage, then a programmatic call or message may be transmitted with those credentials to request the deletion.

In yet another variation, at any of block 322 to block 328 inclusive, the process may be programmed to identify two or more different versions of particular datasets, based upon version identifiers or version metadata in the datasets or in other sources, and to perform similar delete operations on all the versions that are identified. Thus, the process of FIG. 3B may be executed against all of several versions of tables or datasets that are identified.

At block 330, the process is programmed to delete any historical builds of the same derived datasets if they exist and any other metadata relating to these that might contain traces of the candidate records. Historical builds consist of derived datasets that are similarly named or tagged, but have a timestamp indicating creation in the past.

Therefore, the embodiment of FIG. 1, when operated in the manner described for FIG. 3A, FIG. 3B with datasets that have any form of raw-derived relationships like those that are shown by example in FIG. 2, provides the technical benefit and improvement of automatically causing assured deletion of all instances of a specified data item or unit, in a distributed database system in which copies of the data item or unit may be represented across multiple raw and derived datasets as well as historical builds of the derived datasets. An application instance 132, external computer 138, or other source may specify data to be deleted and achieve the assured removal of all relevant data records from raw datasets, derived datasets downstream, and historical builds of those derived datasets, even in a distributed database system with the property of immutability.

Embodiments may be used effectively and efficiently in relational database systems that feature tables and materialized views of the tables, as well as raw datasets and derived datasets as described herein, with or without systems of record such as POSTGRES.

Various embodiments may implement log or notification recording functions to create metadata specifying which account, computer or user requested, created, approved or executed a deletion request or deletion operation. For example, in FIG. 3A at block 312, 314 the process may be programmed to create and store log file records, or transmit notification messages, specifying which user, account or computer performed, requested or executed the associated operation. Similar log records or notifications may be created or transmitted after block 330 when a set of deletion operations completes. Log records or notifications may include, in an embodiment, identification of who requested or performed an operation, who approved an operation, the number of rows involved in an operation, hash values of what was detected to delete, versions, rematerialize identifications and other metadata values. In this manner a complete audit trail of deletion operations may be maintained, which may have operational, legal or other benefits.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
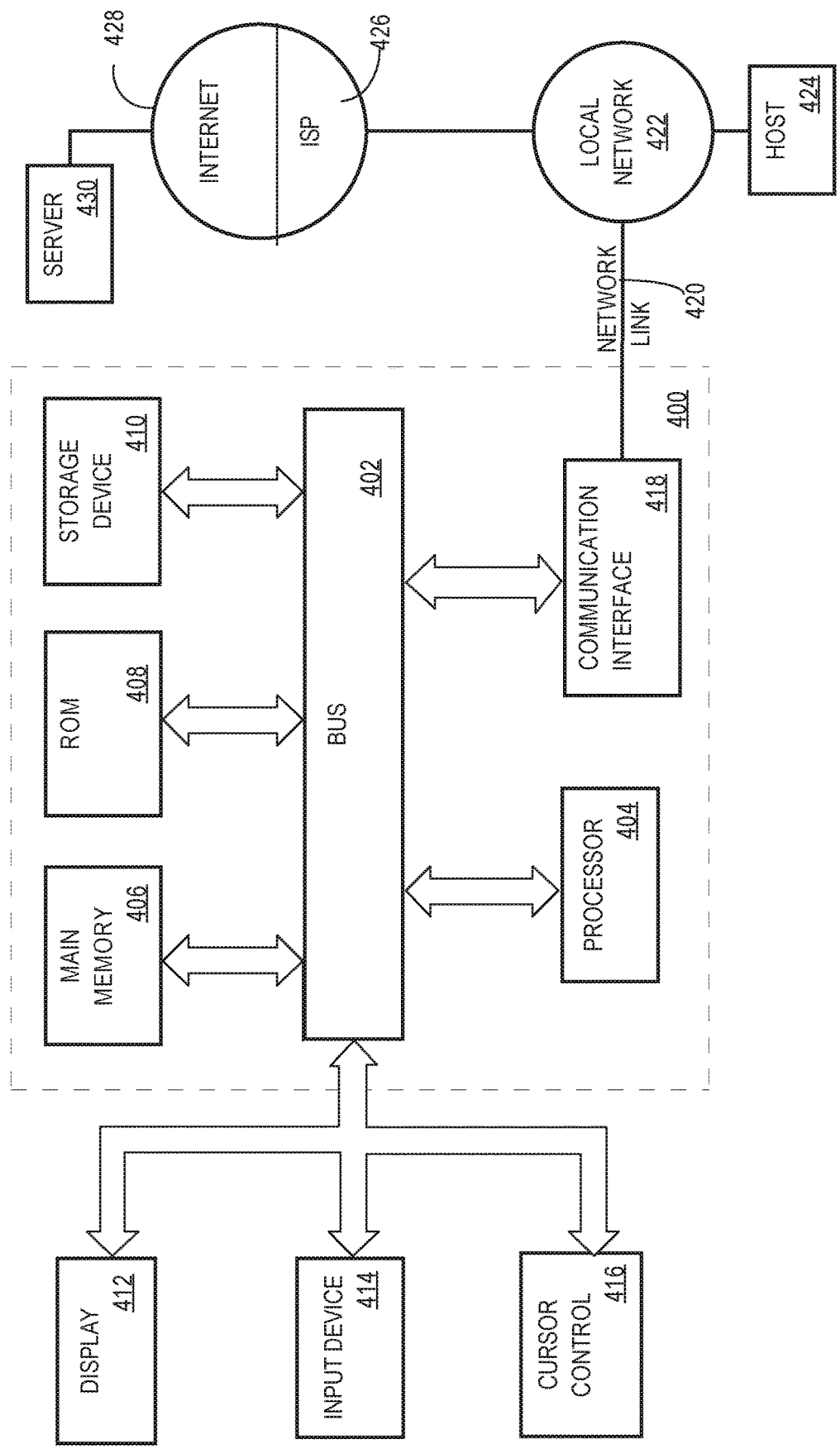
FIG. 4 is a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Implementation Example—Basic Software System

Figure 5:
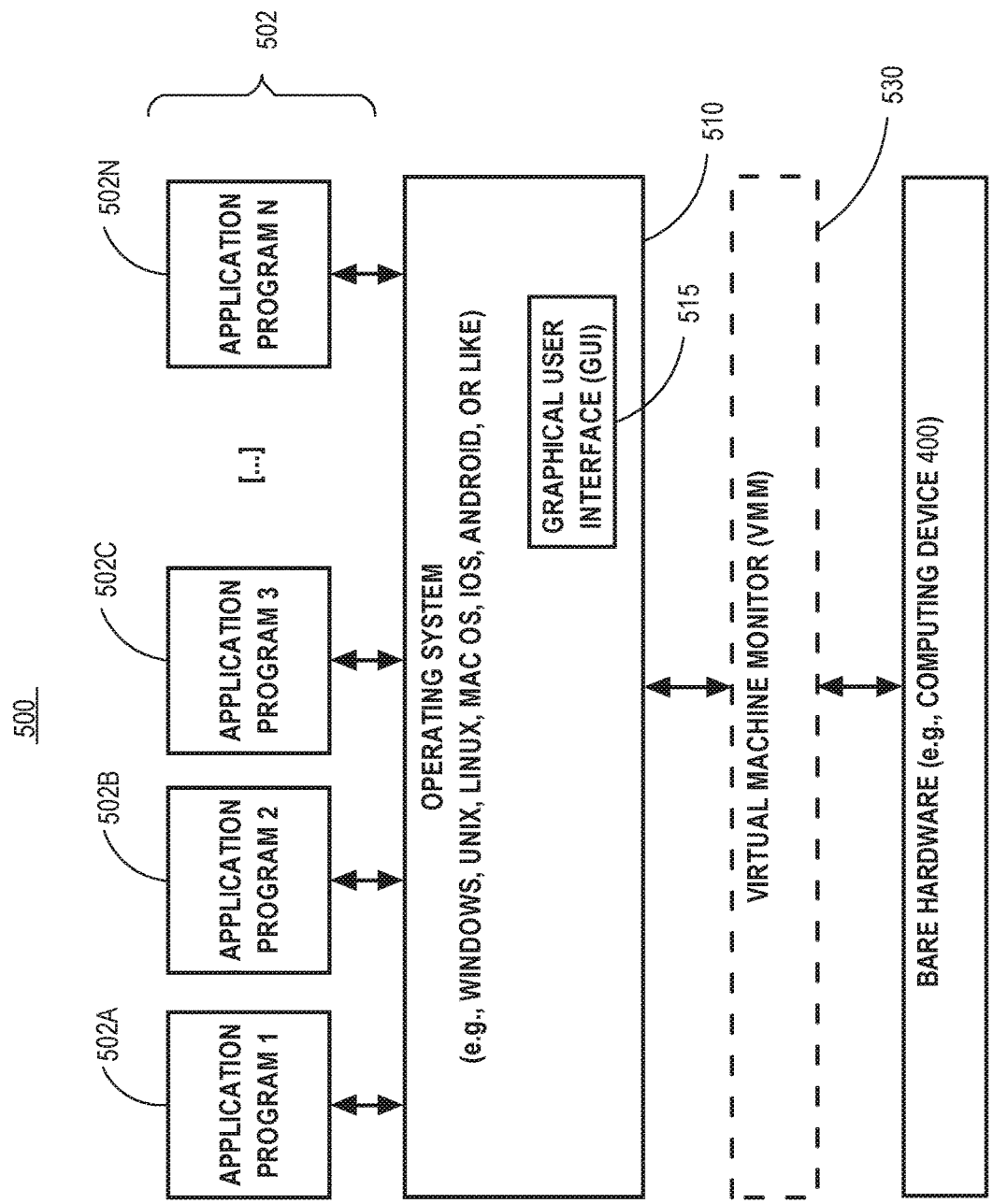
FIG. 5 is a block diagram of a basic software system that may be employed for controlling the operation of a computing device.

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:
1. A computer-implemented method comprising:
using a distributed database system that is programmed to manage a plurality of different raw datasets and a plurality of derived resilient distributed datasets that have been derived from the plurality of different raw datasets based on a plurality of derivation relationships that link the plurality of different raw datasets to the plurality of derived resilient distributed datasets;
determining one or more particular raw datasets of the plurality of different raw datasets that contain a subset of records that are candidates for propagated deletion of specified data values;
deleting the specified data values from the one or more particular raw datasets;

based on one or more of the plurality of derivation relationships, identifying one or more particular derived resilient distributed datasets, of the plurality of derived resilient distributed datasets, that have been derived from the one or more particular raw datasets;

wherein each particular derived resilient distributed dataset of the one or more particular derived resilient distributed datasets is a read-only partitioned collection of records in the distributed database system;

generating and executing a particular build of the one or more particular derived resilient distributed datasets from the one or more particular raw datasets from which the specified data values are deleted to result in creating and storing one or more new particular derived resilient distributed datasets without the specified data values that were deleted from the one or more particular raw datasets; and deleting the specified data values from one or more historical builds of the one or more particular derived resilient distributed datasets from the one or more particular raw datasets that were built prior to the particular build;

wherein the method is performed using one or more processors.

2. The method of claim 1, further comprising deleting one or more historical builds of the same derived resilient distributed datasets for which a build was generated and executed.

3. The method of claim 2, further comprising:
determining the one or more particular raw datasets that contain the subset of records by accessing metadata in the distributed database system to determine one or more raw datasets in which a copy or trace of the subset of records resides;

as part of the deleting the one or more historical builds, also deleting any metadata in the distributed database system that contain data traces from the subset of records that are candidates for propagated deletion of the specified data values.

4. The method of claim 1, wherein the distributed database system has a property of immutability.

5. The method of claim 1, wherein the steps of identifying, generating, and executing comprise traversing a directed graph, which is represented in metadata stored in the distributed database system, in which nodes represent raw datasets or derived resilient distributed datasets and in which links represent derivation relationships of the nodes.

6. The method of claim 1, wherein the steps of identifying, generating, and executing comprise inspecting metadata stored in the plurality of derived resilient distributed datasets that specifies which of the plurality of different raw datasets were sources for the plurality of derived resilient distributed datasets.

7. The method of claim 1, wherein the steps of the method are executed via programmatic cooperation of an SQL interface, a core resilient distributed dataset processor, one or more worker processes and the distributed database system.

8. The method of claim 1, wherein at least one of the plurality of derived resilient distributed datasets is managed in a POSTGRES system.

9. The method of claim 1, further comprising receiving a deletion request that specifies parameters of data to be deleted via a programmatic call, input at a host computing device, from a cron job or from a script that executes according to a schedule.

10. A computer system comprising:
one or more processors;
one or more storage media;
one or more sequences of instructions stored in the one or more storage media which, when executed by the one or more processors, cause performance of:
using a distributed database system that is programmed to manage a plurality of different raw datasets and a plurality of derived resilient distributed datasets that have been derived from the plurality of different raw datasets based on a plurality of derivation relationships that link the plurality of different raw datasets to the plurality of derived resilient distributed datasets;

determining one or more particular raw datasets of the plurality of different raw datasets that contain a subset of records that are candidates for propagated deletion of specified data values;

deleting the specified data values from the one or more particular raw datasets;

based on one or more of the plurality of derivation relationships, identifying one or more particular derived resilient distributed datasets, of the plurality of derived resilient distributed datasets, that have been derived from the one or more particular raw datasets;

wherein each particular derived resilient distributed dataset of the one or more particular derived resilient distributed datasets is a read-only partitioned collection of records in the distributed database system;

generating and executing a particular build of the one or more particular derived resilient distributed datasets from the one or more particular raw datasets from which the specified data values are deleted to result in creating and storing one or more new particular derived resilient distributed datasets without the specified data values that were deleted from the one or more particular raw datasets; and deleting the specified data values from one or more historical builds of the one or more particular derived resilient distributed datasets from the one or more particular raw datasets that were built prior to the particular build.

11. The system of claim 10, further comprising sequences of instructions which when executed cause deleting one or more historical builds of the same derived resilient distributed datasets for which a build was generated and executed.

12. The system of claim 11, further comprising sequences of instructions which when executed cause: determining the one or more particular raw datasets that contain the subset of records by accessing metadata in the distributed database system to determine one or more raw datasets in which a copy or trace of the subset of records resides;

as part of the deleting the one or more historical builds, also deleting any metadata in the distributed database system that contain data traces from the subset of records that are candidates for propagated deletion of the specified data values.

13. The system of claim 10, wherein the distributed database system has a property of immutability.

14. The system of claim 10, wherein the sequences of instructions which cause identifying, generating, and executing further comprise sequences of instructions which when executed cause traversing a directed graph, which is represented in metadata stored in the distributed database system, in which nodes represent raw datasets or derived resilient distributed datasets and in which links represent derivation relationships of the nodes.

15. The system of claim 10, wherein the sequences of instructions which cause identifying, generating, and executing comprise sequences of instructions which when executed cause inspecting metadata stored in the plurality of derived resilient distributed datasets that specifies which of the plurality of different raw datasets were sources for the plurality of derived resilient distributed datasets.

16. The system of claim 10, wherein the sequences of instructions are executed via programmatic cooperation of an SQL interface, a core resilient distributed dataset processor, one or more worker processes and the distributed database system.

17. The system of claim 10, wherein at least one of the plurality of derived resilient distributed datasets is managed in a POSTGRES system.

18. The system of claim 10, further comprising sequences of instructions which when executed cause receiving a deletion request that specifies parameters of data to be deleted via a programmatic call, input at a host computing device, from a cron job or from a script that executes according to a schedule.

19. One or more non-transitory computer-readable storage media comprising instructions which, when executed, cause:
using a distributed database system that is programmed to manage a plurality of different raw datasets and a plurality of derived resilient distributed datasets that have been derived from the plurality of different raw datasets based on a plurality of derivation relationships that link the plurality of different raw datasets to the plurality of derived resilient distributed datasets;
determining one or more particular raw datasets of the plurality of different raw datasets that contain a subset of records that are candidates for propagated deletion of specified data values;
deleting the specified data values from the one or more particular raw datasets;
based on one or more of the plurality of derivation relationships, identifying one or more particular derived resilient distributed datasets, of the plurality of derived resilient distributed datasets, that have been derived from the one or more particular raw datasets;
wherein each particular derived resilient distributed dataset of the one or more particular derived resilient distributed datasets is a read-only partitioned collection of records in the distributed database system;
generating and executing a particular build of the one or more particular derived resilient distributed datasets from the one or more particular raw datasets from which the specified data values are deleted to result in creating and storing one or more new particular derived resilient distributed datasets without the specified data values that were deleted from the one or more particular raw datasets; and
deleting the specified data values from one or more historical builds of the one or more particular derived resilient distributed datasets from the one or more particular raw datasets that were built prior to the particular build.

20. The non-transitory computer-readable storage media of claim 19, further comprising instructions which, when executed, cause:
determining the one or more particular raw datasets that contain the subset of records by accessing metadata in the distributed database system to determine one or more raw datasets in which a copy or trace of the subset of records resides;
as part of the deleting the one or more historical builds, also deleting any metadata in the distributed database system that contain data traces from the subset of records that are candidates for propagated deletion of the specified data values.

* * * * *